(12) United States Patent
Evans et al.

(10) Patent No.: US 10,343,654 B2
(45) Date of Patent: Jul. 9, 2019

(54) CONVERTIBLE TONGUE JACK (71) Applicant: LIPPERT COMPONENTS, INC., Elkhart, IN (US)

(72) Inventors: Samual Evans, Granger, IN (US); Evan Whitney, Edwardsburg, MI (US); Nathan Brunck, Auburn, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 0 days.

(21) Appl. No.: 15/964,895

(22) Filed: Apr. 27, 2018

(65) Prior Publication Data
US 2018/0312143 A1 Nov. 1, 2018

Related U.S. Application Data (60) Provisional application No. 62/490,930, filed on Apr. 27, 2017.

(51) Int. Cl.
*B60S 9/08* (2006.01)
*B66F 3/44* (2006.01)
*B66F 3/08* (2006.01)

(52) U.S. Cl.
CPC .......... *B60S 9/08* (2013.01); *B66F 3/08* (2013.01); *B66F 3/44* (2013.01)

(58) Field of Classification Search
CPC ...... B60S 9/02; B60S 9/04; B60S 9/06; B60S 9/08
USPC ..... 280/763.1, 764.1, 765.1, 766.1; 254/419, 254/420, 424, 425
See application file for complete search history.

(56) References Cited

U.S. PATENT DOCUMENTS

| | | | | |
|---|---|---|---|---|
| 3,595,527 A | * | 7/1971 | Douglass | B60D 1/66 254/420 |
| 3,632,086 A | * | 1/1972 | Mai | B60D 1/66 254/419 |
| 3,636,729 A | | 1/1972 | Patel | |
| 3,861,648 A | * | 1/1975 | Glassmeyer | B60D 1/66 254/419 |
| 3,921,958 A | * | 11/1975 | Brockelsby | B60D 1/66 254/420 |
| 4,080,844 A | | 3/1978 | Killian | |
| 4,187,733 A | * | 2/1980 | Walther | B60D 1/66 254/419 |
| 4,238,113 A | * | 12/1980 | Adams | B60S 9/08 254/134 |
| 4,466,637 A | * | 8/1984 | Nelson | B60S 9/04 254/419 |
| 4,627,468 A | | 12/1986 | Wilke et al. | |

(Continued)

FOREIGN PATENT DOCUMENTS

CN 102364017 2/2012

OTHER PUBLICATIONS

Atwood, "Power Jack," Manual for RV and Marine Applications (2007).

(Continued)

*Primary Examiner* — Jeffrey J Restifo
(74) *Attorney, Agent, or Firm* — Nixon & Vanderhye P.C.

(57) ABSTRACT

A trailer tongue jack is convertible between operation by an integral actuator and an external actuator. The jack includes a clutch mechanism or coupler operable to selectively engage a drive screw with the integral actuator or the external actuator.

20 Claims, 8 Drawing Sheets

(56) References Cited

U.S. PATENT DOCUMENTS

| | | | | |
|---|---|---|---|---|
| 4,796,864 A * | 1/1989 | Wilson | B60S 9/08 | 254/103 |
| 4,842,252 A * | 6/1989 | McMahan | G02B 23/16 | 254/424 |
| 5,050,845 A * | 9/1991 | Aline | B60S 9/12 | 254/419 |
| 5,174,550 A * | 12/1992 | Pittman | B60S 9/18 | 254/420 |
| 5,199,738 A * | 4/1993 | VanDenberg | B60S 9/08 | 192/69.91 |
| 5,238,266 A * | 8/1993 | VanDenberg | B60S 9/08 | 248/188.4 |
| 5,421,555 A * | 6/1995 | Sims | B60D 1/66 | 254/420 |
| 5,423,518 A * | 6/1995 | Baxter | B60S 9/08 | 254/419 |
| 5,538,225 A * | 7/1996 | VanDenberg | B60S 9/08 | 254/419 |
| 5,697,745 A | 12/1997 | Shaw | | |
| 5,904,342 A * | 5/1999 | Laarman | B60S 9/08 | 16/406 |
| 5,911,437 A * | 6/1999 | Lawrence | B60S 9/10 | 254/419 |
| 5,984,353 A * | 11/1999 | Rasmussen | B60S 9/04 | 188/83 |
| 6,010,154 A * | 1/2000 | Payne | B25B 13/48 | 279/904 |
| 6,086,099 A * | 7/2000 | Kingsbury | B60S 9/08 | 254/419 |
| 6,099,016 A * | 8/2000 | Peveler | B60S 9/08 | 254/419 |
| 6,141,997 A * | 11/2000 | Blehi, III | B60R 25/001 | 280/763.1 |
| 6,224,103 B1 * | 5/2001 | Hatcher | B60S 9/08 | 254/419 |
| 6,446,937 B1 | 9/2002 | Straw, Sr. et al. | | |
| 6,598,886 B2 * | 7/2003 | Baird | B60P 1/56 | 254/419 |
| 6,846,016 B2 * | 1/2005 | VanDenberg | B60S 9/08 | 248/188.2 |
| 6,926,305 B2 * | 8/2005 | Daniel | B60S 9/08 | 254/419 |
| 7,036,847 B2 * | 5/2006 | Alguera | B60S 9/08 | 280/763.1 |
| 7,055,859 B2 * | 6/2006 | Peveler | B60S 9/08 | 254/419 |
| 7,083,196 B2 * | 8/2006 | Riedl | B60S 9/08 | 248/188.2 |
| 7,163,207 B2 * | 1/2007 | Baird | B60P 1/56 | 254/419 |
| 7,240,921 B2 * | 7/2007 | Baxter | B60S 9/08 | 280/6.153 |
| 7,258,363 B2 * | 8/2007 | Baxter | B60S 9/08 | 280/6.153 |
| 7,296,779 B2 * | 11/2007 | Bakshi | A47B 91/026 | 248/354.1 |
| 7,311,332 B2 * | 12/2007 | Baxter | B60S 9/08 | 254/419 |
| 7,325,786 B2 * | 2/2008 | Drake, III | B60S 9/08 | 254/419 |
| 7,429,061 B2 * | 9/2008 | Perkins | B60S 9/08 | 280/763.1 |
| 7,575,249 B2 * | 8/2009 | Riedl | B60S 9/08 | 254/419 |
| 7,584,677 B1 * | 9/2009 | Johnson | B60D 1/66 | 254/424 |
| 7,611,160 B1 * | 11/2009 | Ignacio | B60S 9/08 | 254/418 |
| 8,091,922 B2 * | 1/2012 | McMahan | B60S 9/08 | 254/420 |
| 8,220,833 B2 * | 7/2012 | Van Der Plaats | B60S 9/08 | 280/763.1 |
| 8,246,011 B1 * | 8/2012 | Fox, III | B60D 1/66 | 254/418 |
| 8,276,941 B2 * | 10/2012 | Riedl | B60S 9/08 | 280/763.1 |
| 8,579,326 B2 * | 11/2013 | Righetti | B60S 9/08 | 254/418 |
| 8,590,417 B1 * | 11/2013 | Bono | G05G 1/085 | 254/419 |
| 8,622,426 B2 * | 1/2014 | Riedl | B60S 9/08 | 254/418 |
| 8,827,309 B1 * | 9/2014 | Ouellet | B60S 9/08 | 254/418 |
| 8,894,039 B2 * | 11/2014 | Conaway | B60S 9/08 | 254/419 |
| 8,910,924 B2 * | 12/2014 | Alanko | B60S 9/08 | 254/418 |
| 9,242,622 B1 * | 1/2016 | Sanders | B60S 9/08 | |
| 9,308,894 B2 * | 4/2016 | Lusty | B60S 9/22 | |
| 9,393,936 B1 * | 7/2016 | Grote | B60S 9/08 | |
| 9,469,281 B2 * | 10/2016 | Klassy | B60S 9/08 | |
| 9,598,057 B2 * | 3/2017 | Oestreich | B60S 9/08 | |
| 9,937,902 B2 * | 4/2018 | Klassy | B60S 9/08 | |
| 10,000,189 B2 * | 6/2018 | Zimmerman | B60D 1/66 | |
| 2014/0300117 A1 | 10/2014 | Scheffler et al. | | |

OTHER PUBLICATIONS

Gemini Valve, Technical Data Sheet, 600 Series Electric Actuators (Undated. Believed to have been published prior to Apr. 27, 2017).

* cited by examiner

CONVERTIBLE TONGUE JACK

CROSS-REFERENCE TO RELATED APPLICATION

This application claims benefit of U.S. Provisional Patent Application No. 62/490,930, filed on Apr. 27, 2017, and incorporates by reference the disclosure thereof in its entirety. Any conflict between the foregoing disclosure and the present disclosure shall be resolved in favor of the present disclosure.

BACKGROUND AND SUMMARY OF THE DISCLOSURE

A trailer may be provided with a tongue jack to support the tongue of the trailer when the trailer is not hitched to a tow vehicle and to raise and lower the tongue of the trailer to facilitate hitching and unhitching of the trailer to and from the tow vehicle. Tongue jacks come in both power-operated and manually-operated forms. Manually-operated tongue jacks have the advantages of being relatively low in cost, weight, and complexity, but they can require considerable effort to operate. Power-operated tongue jacks have the advantage of being relatively easy to operate, but they are relatively costly and heavy, and they require a power source to be operable. One such power source is the tow vehicle's electrical system, which may provide power to the jack through the trailer's brake system and lighting system electrical harness. Another such power source is a trailer-mounted battery. The tow vehicle's electrical system may be a lower cost alternative than a trailer-mounted battery, but reliance on the tow vehicle's electrical system to power the jack requires that the tow vehicle be present and that its electrical system be connected to the trailer, which may not always be possible or convenient. Reliance on a trailer-mounted battery may be more convenient in some regards, but such a battery adds cost, adds weight to and occupies space on the trailer, and must be properly maintained. In any event, lack of or failure of a suitable power supply may render a power-operated jack inoperable.

A power-operated jack may be provided with a manual override to maintain operability of the jack in the absence of a power source. Such a manual override, however, typically is provided and intended as a secondary means for operating the power-operated jack, and it may add even more weight, cost, and complexity to the jack.

The present disclosure is directed to a tongue jack convertible for operation either by an integral actuator, for example, a manually-operated crank, or an external actuator. The external actuator may be power-operated.

DETAILED DESCRIPTION OF THE DRAWINGS

The drawings show an illustrative embodiment of a tongue jack 20 convertible for operation by an integral actuator and an external actuator according to the present disclosure.

The tongue jack 20 includes an elongated, generally cylindrical and annular first (or outer) tube 42 having a first (or upper) end and a second (or lower) end. A mounting plate 24 is attached, for example, by welding, to the outer tube 42 between the first end and the second end thereof. The mounting plate 24 is generally triangular, having three sides and three corners, and defining a radially-extending elongated aperture (or slot) 25 near each of the three corners. The slots 25 are configured to receive fasteners that may be used to fasten the jack 20 to a trailer frame. A disc 52 generally covers the open first end of the outer tube 42. The disc 52 defines an opening 46 therein.

The tongue jack 20 also includes an elongated, generally cylindrical and annular second (or inner) tube 44 slidingly received within the outer tube 42. The inner tube 44 defines a threaded inner surface. Alternatively, a drive nut (not shown) having internal threads may be received within and non-rotatingly connected the inner tube 44. The inner tube 44 is keyed to the outer tube 42 so that the inner tube and the outer tube may slide but not freely rotate with respect to each other. In an embodiment, the inner tube 42 and outer tube 44 could be square or otherwise shaped so as to be inherently keyed together.

Figure 6:
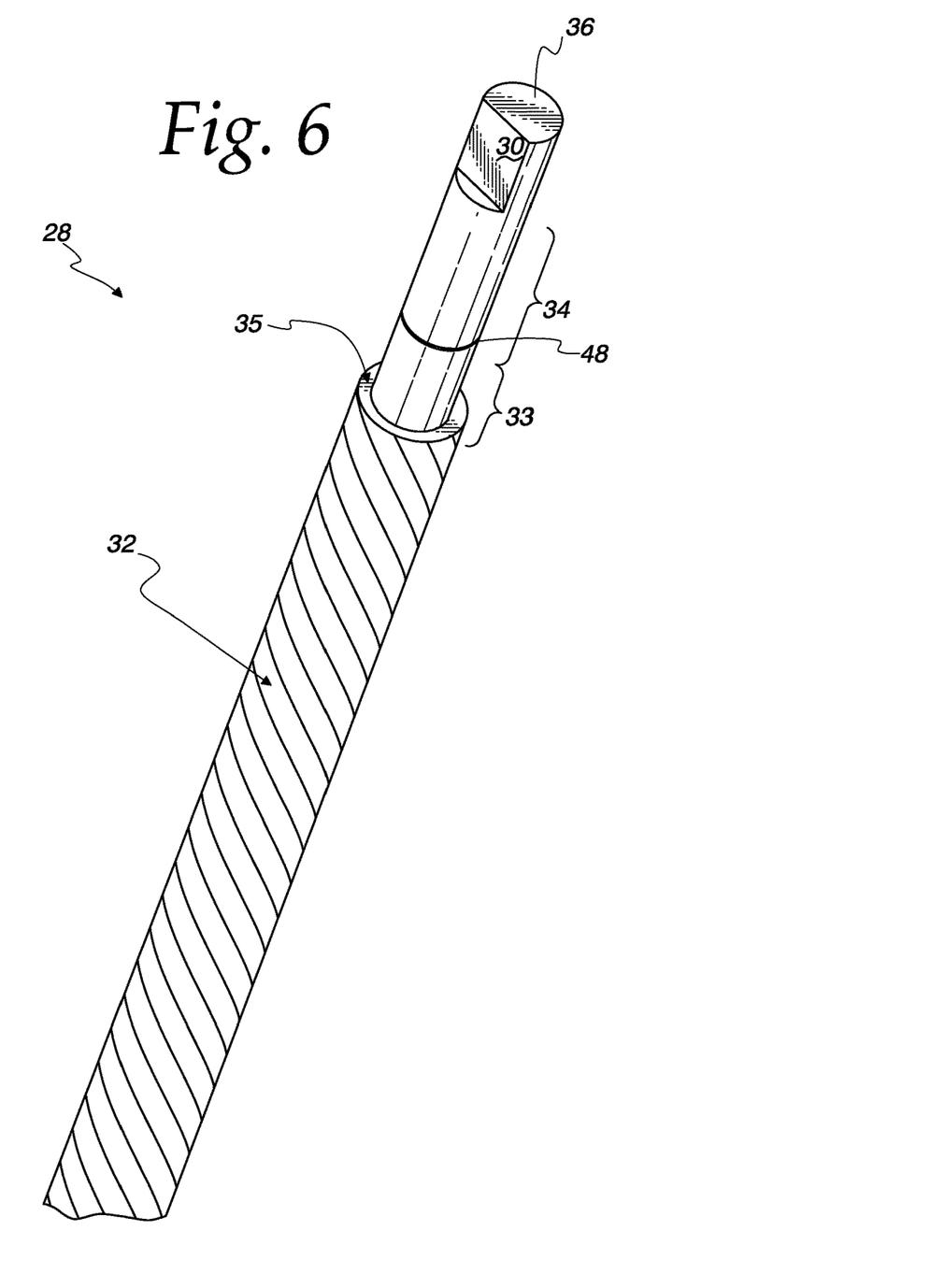
FIG. 6 is a perspective view of a drive screw of a tongue jack according to the present disclosure.

As best shown in FIG. 6, an elongated drive screw 28 having a first (or upper) end and a second (or lower) end includes a generally cylindrical drive portion 32, a generally cylindrical first hub portion 33, a generally cylindrical second hub portion 34, and a generally cylindrical driven (or actuator engagement) portion 36. The drive screw 28 defines a circumferential groove 48 generally separating the first hub portion 33 from the second hub portion 34.

The drive portion 32 defines a threaded outer surface having a first major diameter. The threaded outer surface of the drive portion 32 of the drive screw 28 is configured for threaded engagement with the threaded inner surface of the inner tube 44 (or the drive nut (not shown), if provided).

The first hub portion 33 defines a generally smooth outer surface having a second diameter lesser than the first major diameter of the drive portion 32. As such, the interface between the drive portion 32 and the hub portion 33 defines an annular land 35 circumscribing the outer surface of the first hub portion.

The second hub portion 34 defines a generally smooth outer surface having the second diameter. As mentioned above, the groove 48 separates the first hub portion 33 from the second hub portion 34.

The driven portion 36 extends from the second hub portion 34. The driven portion 36 defines a smooth outer surface nominally having the second diameter. More specifically, the driven portion 36 has a D-shaped cross-section defined by a portion of a circle and a flat corresponding to a chord of the circle. The chord length and depth from the end of the drive screw 28 may be selected as desired to allow for reliable transmission of torque from a complementary drive head to the drive screw 28, as will be discussed further below. In an embodiment, the chord length is selected so that a line perpendicular to the chord, through the center of the drive screw, and to the circumference of the driven portion 36 is about 75% as long as the second diameter. In other embodiments, the driven portion 36 can have other cross-sectional shapes (or one or more key features) providing for such torque transmission.

The drive screw 28 is disposed within the outer tube 42 and secured thereto in rotational engagement therewith. More specifically, a bearing element (not shown) is installed over the first hub portion 33 of the drive screw 28. The bearing element may be a thrust bearing, a rotary bearing, or a combination thrust and rotary bearing. Alternatively, the bearing element may be a bushing. The bearing may have an inner diameter complementary to the second diameter so that there is no or minimal play between the bearing and the first hub portion 33, and so that the land 35 provides axial support for the bearing. The bearing may have a height less than but approximately equal to the length of the first hub portion between the land 35 and the groove 48, minus the thickness of the disc 52. In an embodiment, the bearing or bushing may be omitted.

The first end of the drive screw 28 is received within the outer tube 42 from the second end thereof. The first end of the drive screw extends through the opening 46 in the disc 52 so that the groove 48 is proud of the outer surface of the disc.

A circlip 50 having an outer diameter greater than the diameter of the opening 46 in the disc 52 is engaged with the groove 48. Interference between the circlip 50 and the outer surface of the disc 52 precludes the drive screw 28 from escaping the outer tube 42 through the second end thereof, and interference between the bearing and the disc 52 precludes the drive screw from escaping the outer tube through the first end thereof. As such, the drive screw 28 is axially restrained to the outer tube 42.

The inner tube 44 is threadingly engaged with the drive screw 28 and keyed to the outer tube 42 in sliding engagement therewith. As such, rotation of the drive screw 28 in a first direction causes the inner tube 44 to be drawn in to the outer tube 42, and rotation of the drive screw in a second direction causes the inner tube to extend from the outer tube, as would be understood by one skilled in the art.

A generally cylindrical and annular collar (or coupler) 58 is disposed about the second hub portion 34 of the drive screw 28 in sliding engagement therewith. The collar 58 defines a bore 76 therethrough. A first portion 78 of the bore 76 has an inner diameter complementary to the diameter of the second hub portion 34 of the drive screw 28. A second portion of the bore 76 extending axially inwardly from a first (or upper) end of the collar 58 defines a first counterbore 84 having an inner diameter substantially greater than inner diameter of the first portion 78 of the bore 76. The inner surface of the collar 58 defines a plurality of splines 82 extending axially from the bottom of the first counterbore 84 toward the first portion 78 of the bore 76. A third portion 79 of the bore 76 extending axially inwardly from a second end of the collar 58 defines a second counterbore having an inner diameter substantially greater than inner diameter of the first portion 78 of the bore 76. The second counterbore 79 diameter is greater than the outer diameter of the circlip 50, thereby allowing the circlip to be selectively received within the second counterbore.

A drive head 40 is configured to receive the driven portion 36 of the drive screw 28 in keyed engagement therewith, and to selectively engage with the splines 82 of the collar 58. The drive head defines a D-shaped opening extending axially there through. The D-shaped opening is configured to complement to the D-shaped driven portion 36 of the drive screw 28. The drive head 40 includes a generally cylindrical torque transmitting portion defining a plurality of axially extending splines 38 complementary to the splines 82 of the collar 58. The drive head 40 also includes a torque receiving portion in the form of a hex head having six flats. The drive head 40 may define an aperture 41 extending through one of the flats to the opening in the drive head. The aperture 41 may be internally threaded and configured to receive therein a set screw 43 having complementary external threads. The set screw 43 may be tightened against the flat 30 defined by the driven portion 36 of the drive screw 28 to fix the drive head 40 thereto.

The drive head 40, the drive screw 28, and the collar 58 are configured so that the drive head may selectively slide along the drive screw and the collar splines 82 may selectively engage with and disengage from the drive head splines 38.

The collar 58 defines first and second diametrically opposite holes 74 extending radially therethrough. The holes 74 may be internally threaded and configured to receive corresponding threaded fasteners, as will be discussed further below.

Figure 1:
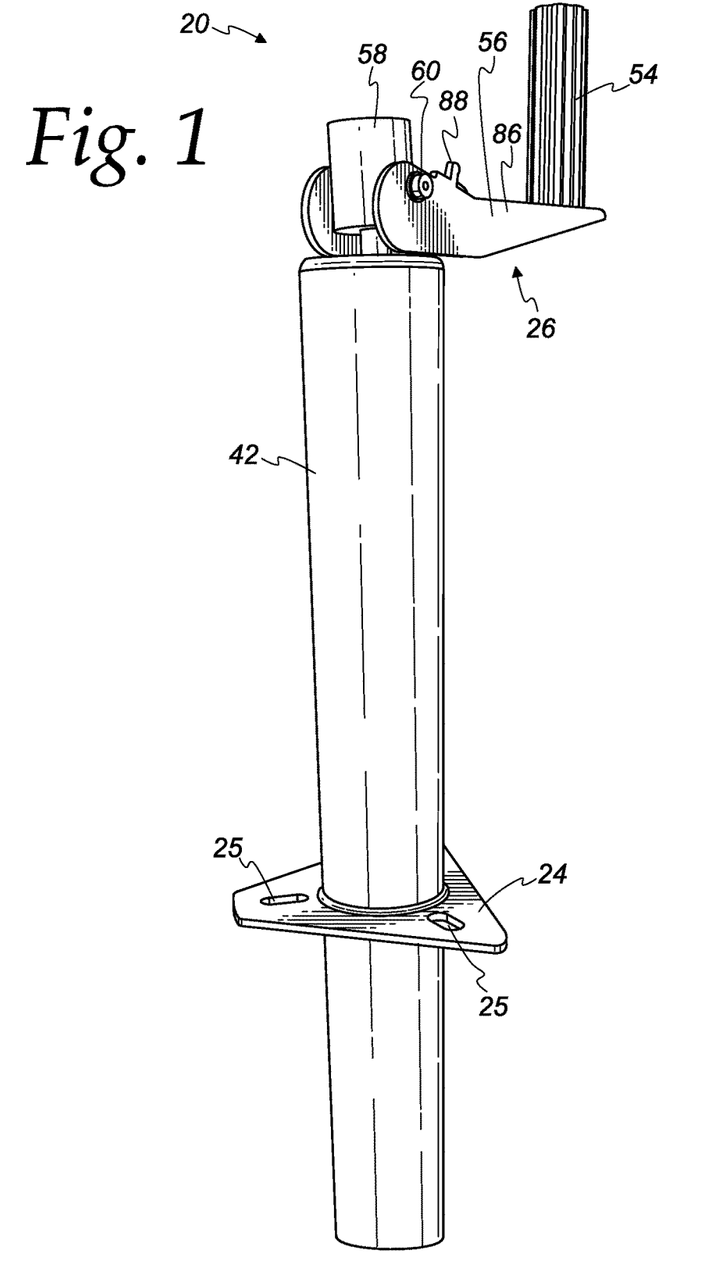
FIG. 1 is a perspective view of a tongue jack according to the present disclosure configured for operation by an integral actuator.
Figure 2:
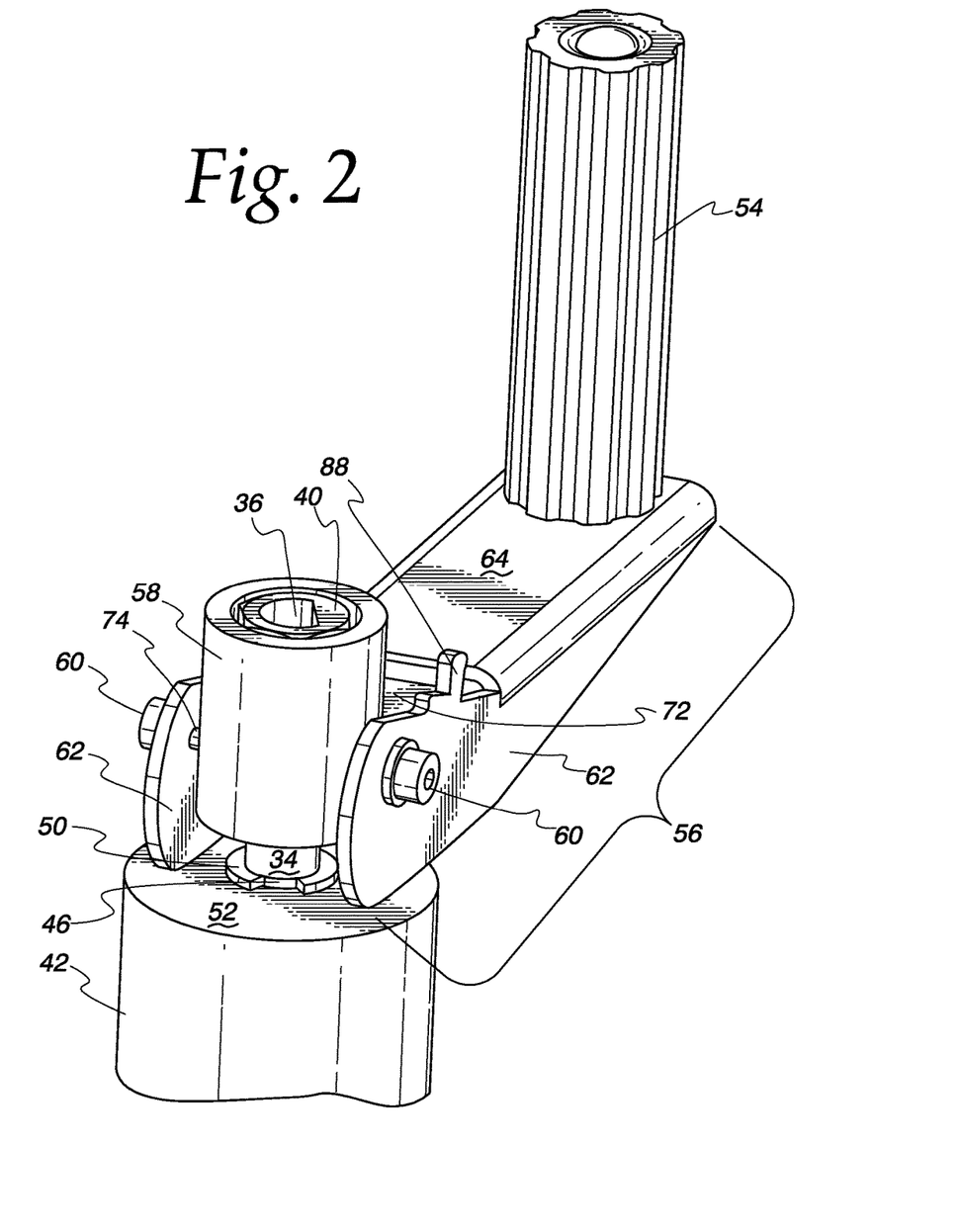
FIG. 2 is a detail perspective view of a tongue jack according to the present disclosure configured for operation by an integral actuator.
Figure 3:
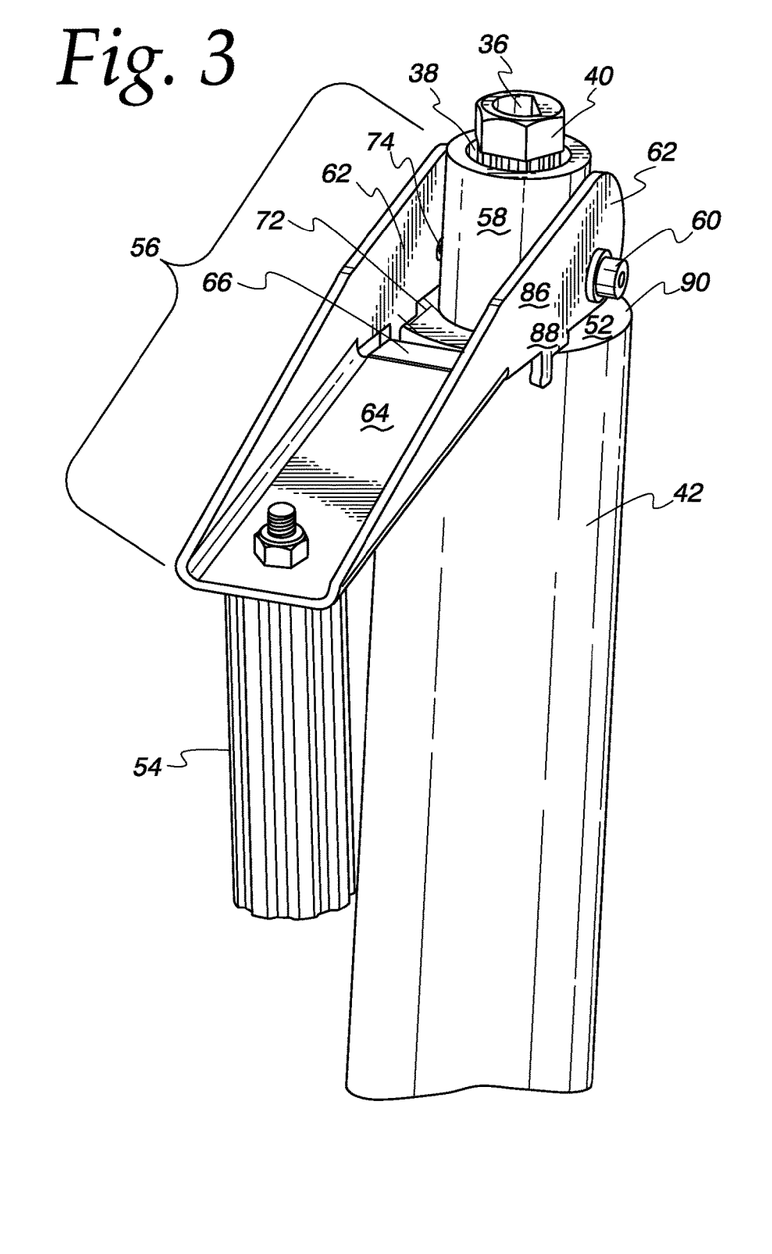
FIG. 3 is a detail perspective view of a tongue jack according to the present disclosure configured for operation by an external actuator.
Figure 4:
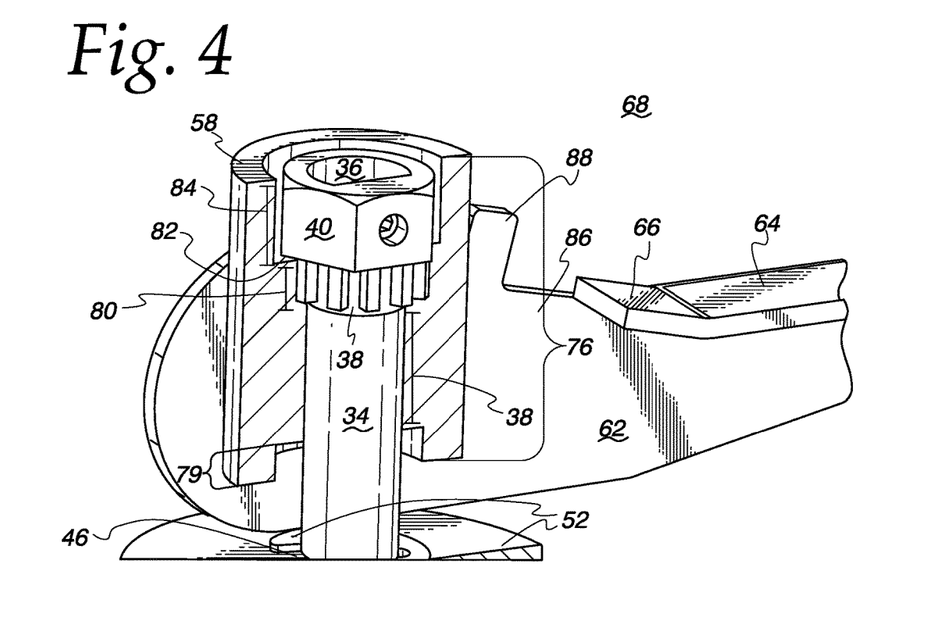
FIG. 4 is a cutaway detail perspective view of a tongue jack according to the present disclosure configured for operation by an integral actuator.
Figure 5:
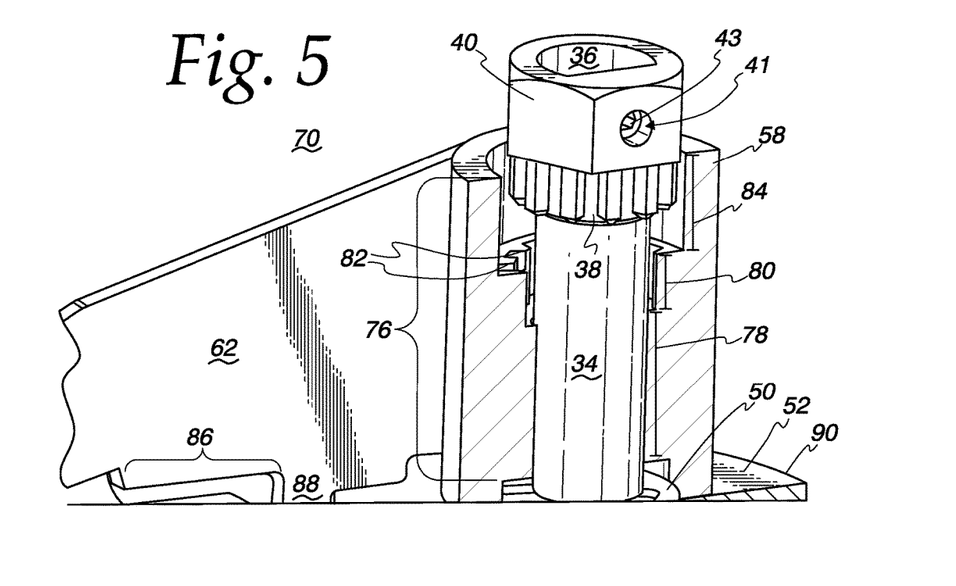
FIG. 5 is a cutaway detail perspective view of a tongue jack according to the present disclosure configured for operation by an external actuator.

An integral actuator (or crank) 56 is pivotally attached to the collar 58. The crank 56 includes a handle 54 attached to a plate 64. The plate 64 in turn is attached to first and second parallel and opposed flanges 62. Each of the flanges 62 includes a cam portion, each cam portion defining a hole 72 therethrough. The flanges 62 are attached to the collar 58 in pivotal engagement by mechanical fasteners 60 extending through the holes 72 therein and into the holes 74 in the collar. The crank 56 is pivotable between a first or stowed position as shown in FIGS. 3 and 5, and a second or deployed position as shown in FIGS. 1, 2, and 4. The flanges 62 may define fingers 88 that may engage with the outer surface of the disc 50 and/or the first end of the outer tube 42 to limit the pivotal travel of the crank in the stowed position.

Figure 7:
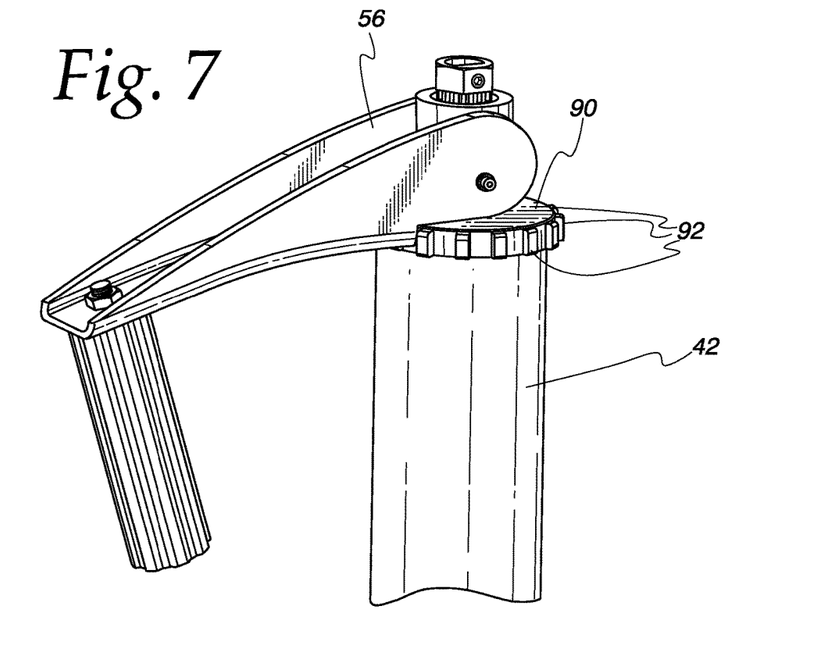
FIG. 7 is a detail perspective view of another embodiment of a tongue jack according to the present disclosure configured for operation by an external actuator.
Figure 8:
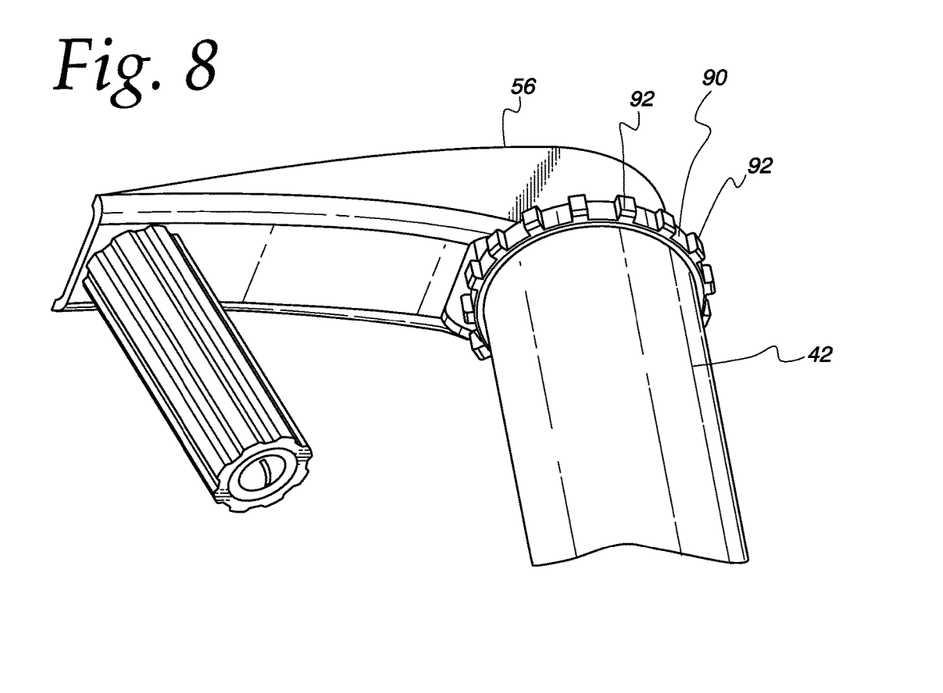
FIG. 8 is another detail perspective view of the tongue jack of FIG. 7 configured for operation by an external actuator.

In an embodiment, as shown in FIGS. 7 and 8, a ring 90, which may be made of a resilient material, may be disposed about the first end of the outer tube 42. The ring 90 may have a circumference defining teeth 92, with adjacent pairs of such teeth configured to receive a complementary portion, for example, one or more of the fingers 88, of the crank 56 therebetween. Travel of the crank 56 toward the stowed position may be limited by interaction between the ring 90 and crank 56. The ring 90 may be substantially fixed to the outer tube 42 in non-rotational engagement therewith to mitigate a tendency of the crank 56 to rotate when the drive screw is driven by an external actuator, as will be discussed further below. Such fixing may be, for example, by adhesive, fasteners, or friction between the crank 56 and the outer tube 42.

Figure 9:
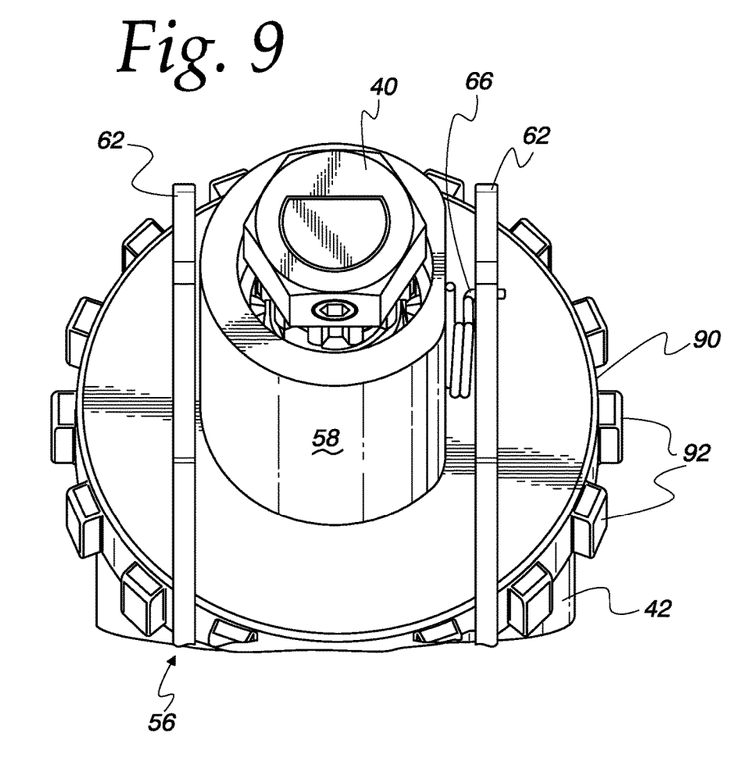
FIG. 9 is a partial perspective view of the tongue jack of FIG. 7 further including a biasing mechanism configured to bias the integral actuator to an unengaged position.

The cam portions define edges (or lobe surfaces) 86 engaged or engageable with the outer surface of the disc 50. The cam portions are shaped to cause the collar 58 to move between a first position relatively near the outer tube 42 and a second position relatively far from the outer tube when the crank 56 is moved between the first position and the second position, respectively. With the crank 56 and the collar 58 in their respective first positions, as shown in FIG. 3, the collar splines 38 are disengaged from the drive head splines 82, and the flats of the drive head 40 extend beyond the upper surface of the collar 58. With the crank 56 and the collar 58 in their respective second positions, as shown in FIG. 2, the collar spines 38 are engaged with the drive head splines 82, and the flats of the drive head 40 are recessed from, flush with, or insufficiently proud of the upper surface of the collar 58 to permit reliable engagement thereof with an external tool or actuator, as will be discussed further below. As optional biasing mechanism could be provided to bias the collar 58 from the second collar position to the first collar position when the crank 56 is moved from the second crank position to the first crank position. For example, as shown in FIG. 9, a torsion spring 66 could be operably disposed between the collar 58 and the integral actuator 56 to bias the collar 58 to the first collar position and bias the integral actuator to an unengaged position, for example, as shown in FIG. 3.

With the crank 56 in the first position, the collar 58 is rotationally disengaged from the drive screw 28, and the drive head 40 extends substantially beyond the upper surface of the collar. As such, an external actuator, for example, a power drill equipped with a socket complementary to the hex portion of the drive head 40, can be connected to the drive head and used to rotate the drive screw 28 in the first and second directions.

With the crank 56 in the second position, the collar 58 is rotationally engaged with the drive screw 28, and the drive head 40 does not extend substantially beyond the upper surface of the collar, thereby precluding attachment of an external actuator thereto with sufficient engagement to permit the actuator to reliably rotate the drive screw in either direction.

The driven portion 36 of the drive screw 28 and the complementary opening in the drive head 40 are disclosed herein as D-shaped. In other embodiments, they could be shaped in any suitable and complementary manner. Similarly, the drive head 40 and the external actuator are disclosed as being hex headed. In other embodiments, the drive head 40 and the external actuator could be shaped in any suitable and complementary manner.

In an embodiment, the relative locations of the outer tube 42 and the inner tube 44 could be inverted. More specifically, in an embodiment, the mounting plate 24 could be attached to the inner tube, rather than the outer tube 44, the drive screw 28 could be rotatingly engaged with and axially restrained to the inner tube, rather than the outer tube, and the drive screw could be threadingly engaged with complementary interior surface of the outer tube or a drive nut received within the outer tube and non-rotatingly attached thereto. With the jack 20 so configured, and the mounting plate 24 attached to the tongue of a trailer, rotation of the drive screw 28 in a first direction would cause the outer tube 42 to extend downward with respect to the inner tube, and rotation of the drive screw in a second direction would cause the outer tube to retract up upward with respect to the inner tube.

Figure 10:
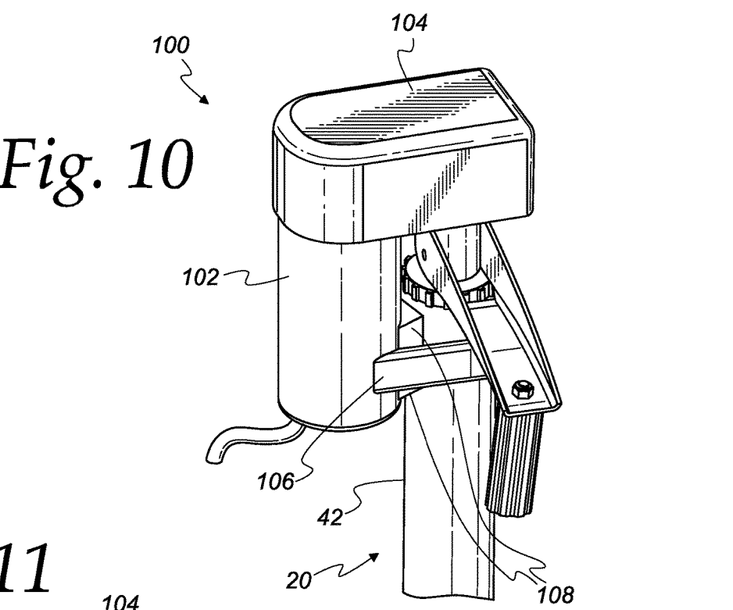
FIG. 10 is a perspective view of an upper portion of the tongue jack of FIG. 7 having a semi-permanent power operated head unit connected to the drive head thereof.
Figure 11:
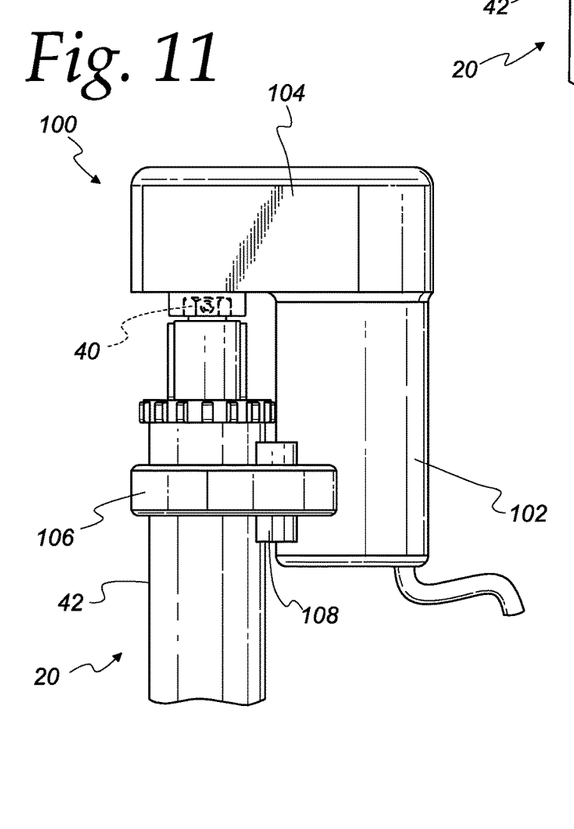
FIG. 11 is an elevation view of the tongue jack of FIG. 9.

FIGS. 10 and 11 show the tongue jack 20 of FIGS. 7 and 8 with a removable, power-operated head unit 100 including a bi-directional electric motor 102 and a transmission 104 connected to the jack 20. More specifically, the motor 102 is strapped to the outer tube 42 of the jack by a strap 106. A bushing 108 having a first portion shaped complimentary to the outer tube 42 and a second portion shaped complementary to the outer surface of the motor 102 may be disposed between the outer tube and the motor.

The transmission 104 has a torque input and a torque output internally connected to the torque input. The torque input is connected to the shaft of the motor 102, and the torque output is connected to the drive head 40 of the jack 20 so that rotation of the motor results in complementary rotation of the drive head.

In use, the motor 102 may be selectively operated in a first direction or second direction, respectively, to selectively retract the inner tube 44 into or extend the inner tube from the outer tube 42 in a manner similar to that described above. In the event of failure of or loss of power to the head unit 100, the head unit may be removed from the jack 20 and the jack may be operated using the integral actuator 56, for example, as described above.

The disclosure shows and describes one or more illustrative embodiments of a convertible tongue jack. The disclosure should not be construed to limit the scope of the claimed invention as recited in the following claims.

The invention claimed is:

1. A convertible jack comprising:
a first tube;
a second tube slidably received within said first tube in keyed engagement therewith;
a drive screw connected to said one of said first tube and said second tube in axially restrained and rotating engagement therewith, said drive screw threadingly engaged with the other of said first tube and said second tube;
a drive head fixedly engaged with said drive screw, said drive head having a first portion configured for selective engagement by an external actuator and a second portion configured for selective engagement by a coupler, said coupler slidingly engaged with said drive screw and selectively engageable with said drive head; and
an integral actuator pivotally connected to said coupler, said integral actuator selectively repositionable between a first position and a second position;
wherein said coupler is engaged with said drive head when said integral actuator is in said first position and wherein said coupler is disengaged from said drive head when said integral actuator is in said second position; and
wherein said drive head is engageable with said external actuator when said integral actuator is in said second position.

2. The convertible jack of claim 1 wherein said drive head is not engageable with said external actuator when said integral actuator is in said first position.

3. The convertible jack of claim 1 wherein said drive head is not engageable with said external actuator in a manner that allows for reliable transmission of torque from said external actuator to said drive head when said integral actuator is in said first position.

4. The convertible jack of claim 1 wherein said integral actuator comprises a cam having a lobe surface engageable with said one of said first tube and said second tube, and wherein said lobe surface interacts with said one of said first tube and said second tube to cause said integral actuator to reposition said coupler between said coupler first position and said coupler second position when said integral actuator is repositioned between said integral actuator first position and said integral actuator second position.

5. The convertible actuator of claim 4 wherein said integral actuator comprises a crank.

6. The convertible actuator of claim 1 wherein said first portion of said drive head is substantially contained within said coupler when said coupler is in said first position.

7. The convertible actuator of claim 1 wherein said coupler is selectively keyed to said drive head.

8. The convertible actuator of claim 7 wherein said coupler comprises a splined portion and said drive head comprises a splined portion, said coupler splined portion selectively engageable with said drive head splined portion.

9. The convertible actuator of claim 1 further comprising a bearing or bushing receiving said drive screw and received by said first tube.

10. The convertible actuator of claim 9 wherein said bearing is either or both of a thrust bearing and a rotational bearing.

11. The convertible actuator of claim 1 wherein said first portion of said drive head comprises a hex head.

12. The convertible jack of claim 1 further comprising a toothed ring disposed about said first tube proximate said integral actuator.

13. The convertible jack of claim 12, said integral actuator further comprising at least one engagement portion configured to be received between adjacent ones of teeth of said toothed ring.

14. The convertible jack of claim 1 wherein said drive head is not engageable by said external actuator when said integral actuator is in said first position.

15. A system comprising the convertible jack of claim 1 and the external actuator.

16. The system of claim 15 wherein the external actuator comprises a hex socket.

17. The system of claim 16 wherein the external actuator further comprises a tool connected to said hex socket.

18. The system of claim 17 wherein said tool is a power tool.

19. The convertible jack of claim 1 wherein said coupler is captured between said drive head and said first tube.

20. The convertible jack of claim 1 wherein said integral actuator is engaged with said drive screw when said integral actuator is in said first position, and wherein said integral actuator is not engaged with said drive screw when said integral actuator is in said second position.

* * * * *

UNITED STATES PATENT AND TRADEMARK OFFICE
CERTIFICATE OF CORRECTION

| | | |
|---|---|---|
| PATENT NO. | : 10,343,654 B2 | Page 1 of 1 |
| APPLICATION NO. | : 15/964895 | |
| DATED | : July 9, 2019 | |
| INVENTOR(S) | : Evans et al. | |

It is certified that error appears in the above-identified patent and that said Letters Patent is hereby corrected as shown below:

On the Title Page

Item (72): delete "Samual" and insert --Samuel--.

Signed and Sealed this
Twenty-fourth Day of September, 2019

Andrei Iancu
*Director of the United States Patent and Trademark Office*